UNITED STATES PATENT OFFICE.

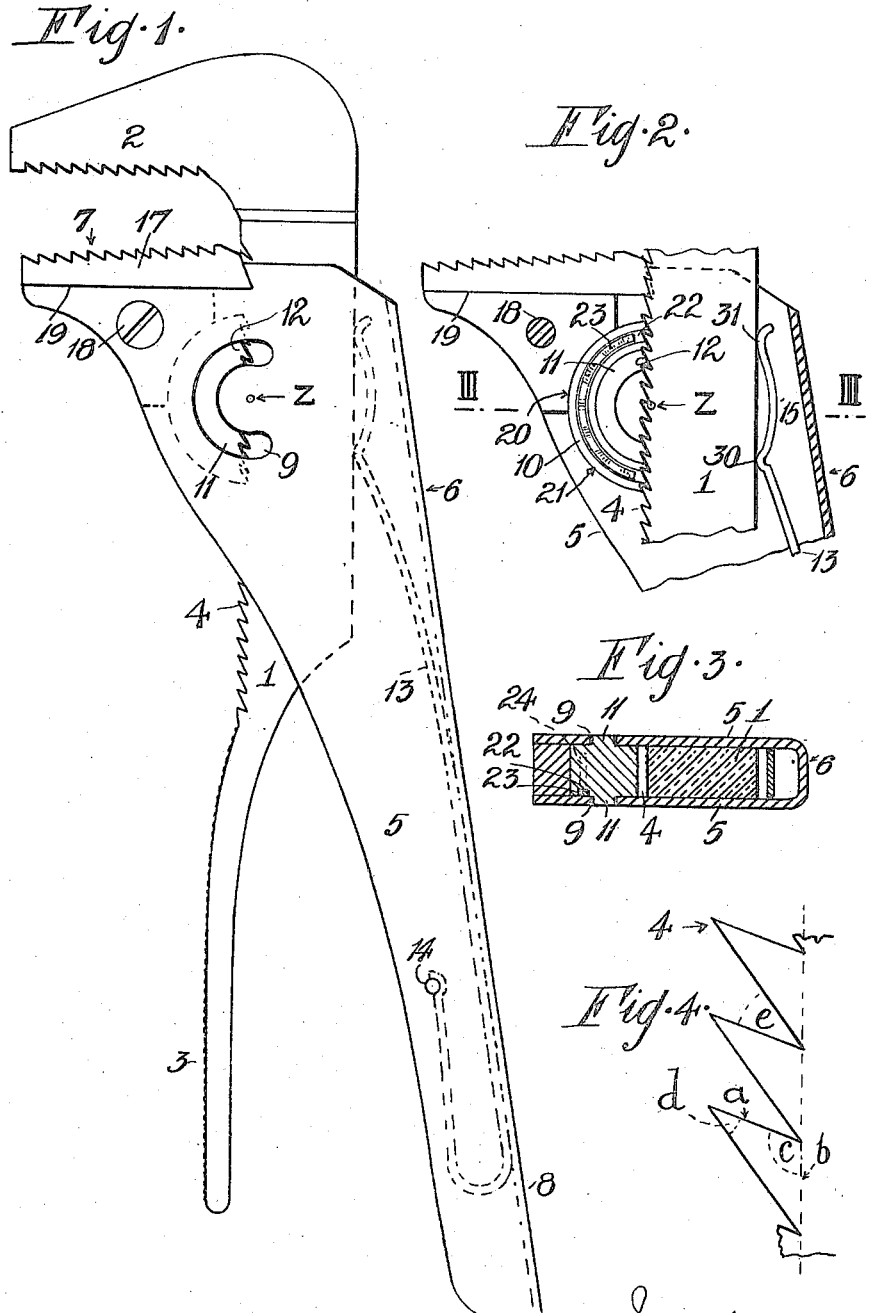

RICHARD MICHAEL CARROLL, OF COOGEE, NEAR SYDNEY, NEW SOUTH WALES, AUSTRALIA.

PIPE AND NUT WRENCH.

1,302,009.

Specification of Letters Patent.   Patented Apr. 29, 1919.

Application filed May 20, 1918.   Serial No. 235,560.

*To all whom it may concern:*

Be it known that I, RICHARD MICHAEL CARROLL, subject of the King of Great Britain, residing at "Wyreema," Dolphin street, Coogee, near Sydney, in the State of New South Wales, Commonwealth of Australia, have invented certain new and useful Improvements in Improved Pipe and Nut Wrenches, of which the following is a specification.

This invention relates to wrenches used for gripping pipes, nuts and the like of the type provided with a loose adjustable fulcrum member having teeth engaging the rack teeth of the upper jaw and which permits width of grip to be adjusted.

In such tools the teeth of the rack and fulcrum members were right angled ratchet teeth which were pressed into engagement by a spring bearing upon a locking slide piece which was necessarily employed when the tool was in use to prevent disengagement of the teeth which would otherwise occur on account of their right angled inclination.

According to the present improvements the sides of the rack teeth meet at a slight inclination and the teeth have a considerable pitch, that is one side is longer than the other. The longer side is the side which joins the point of one tooth to the base of the next lower tooth while the shorter side dips downwardly from the point of the tooth. This arrangement of the rack teeth provides that their upper bearing faces or top sides are at an obtuse angle to the longitudinal face or plane of the rack and fulcrum members and the points and interdental angles or recesses of the teeth form acute angles of less than 45 degrees. As a result of this improved set of the teeth the slide piece heretofore used is dispensed with and a less complex construction of tool provided and moreover such tool may be readily adjusted if necessary by one hand.

Other improvements concern the fulcrum member and other parts as shown in the accompanying drawings depicting a practical example of the tool:

Figure 1 being a plan;

Fig. 2 an interior view of part of same;

Fig. 3 a section on line III—III of Fig. 2; and

Fig. 4 a view illustrating the angularity of the teeth of the rack and fulcrum member.

Referring to these drawings the inner rack member 1 is provided with the upper ratchet toothed jaw 2 and a handle 3 and said member is adjustable longitudinally between the folds or sides 5 of the outer or casing member 6 which is provided with a toothed gripping jaw 7 and formed with a handle 8.

The rack teeth 4, Fig. 4, are set at such an inclination that their upper bearing faces $a$ form with the longitudinal face line or plane $b$ of said rack, an obtuse angle $c$ and the angles of the points $d$ and interdental recesses $e$ are acute and less than 45 degrees— a good working angle being about 35 degrees.

The teeth 12 of the fulcrum member 10 correspond with the rack teeth 4 but are oppositely arranged so as to normally interlock therewith.

It will be evident that the points of the teeth of the fulcrum member and the rack might be cut off or blunted without affecting the operation of the tool.

In the sides 5 of the casing are formed opposed semi-circular segmental slots 9 the radial pivot of which is the pivotal point of the two members 1 and 6 and of the toothed fulcrum member 10 which is located within the casing. Preferably this pivotal point indicated by circle Z is approximately in the longitudinal plane of the recesses of the rack teeth.

The member 10 has on its sides semi-circular trunnions 11 which take into said slots 9 and its teeth 12 are formed on its straight inner face.

These trunnions thus constitute the fulcrum on which the jaw members 1 and 6 pivot when gripping or releasing.

A spring 13 within the casing member is fixed at one end thereto by a pin 14 and its other end 15 is bent to be formed with two contacts 30, 31 to render said spring double acting, said contacts bearing directly upon the back 15 of the rack member and so normally maintain the teeth of the rack and fulcrum member against longitudinal movement.

The two contacts 30, 31 of the spring operate to cause the jaw members 1 and 6 to be normally maintained in the relative positions shown in Fig. 1 when pressure is taken off the handles of said members and when the jaws are moved to grip or release an object, one contact point or the other respectively applies the effective pressure.

As a result of this spring construction a pipe for instance may be gripped by the jaws and the tool worked to and fro to turn said pipe by the operator simply gripping and operating the handle 8 of the casing member 6.

In order to open or close the jaws the inner rack member 1 is forced against the spring until its teeth are clear of those of the fulcrum member 10 when said rack member may be slid freely in longitudinal direction. This operation may be accomplished by one hand by pressing the jaw against a rigid object.

The slots 9 in the sides 5 are somewhat longer than the trunnions 11 to provide for movement of the jaw members.

The lower jaw 7 may be provided with a detachable gripping piece 17 having ratchet teeth on its surface and secured in position for instance by a screw or other fastening 18. The gripping piece is formed preferably with shoulders 19 that bear upon the top edges of the sides 5 and the inner face 20 of said piece is curved and contacts with the correspondingly curved face 21 of the fulcrum member 10 thus relieving the casing of strain and obviating wear on the edges of the slots 9. To prevent the fulcrum member 10 from rocking on its trunnions when not engaged by the rack member 1, and thereby maintain it in operative relation to said rack member when the latter is moved away from and longitudinally thereof, I provide a friction device between the fulcrum member and casing member. The fulcrum member has a segmental recess 22 formed in the side containing a spring 23 which bears against the opposing side 5 of the casing member causing sufficient friction to prevent accidental displacement of the fulcrum member. The spring is held against displacement in the groove by a bend 24 forming a lug which engages a recess in the fulcrum member.

I claim:

1. A pipe wrench comprising a casing member having segmental slots therein, a tooth faced fulcrum member having segmental trunnions mounted in said slots, and a rack member having teeth normally engaging the teeth of the fulcrum member which is rotatable with and operable as a fulcrum for the rack member.

2. A pipe wrench comprising a casing member having segmental slots therein, a tooth-faced fulcrum member having segmental trunnions mounted in said slots, a rack member having teeth normally engaging the teeth of the fulcrum member which is rotatable with and operable as a fulcrum for the rack member, and a spring in the casing member bearing on the rack member.

3. A pipe and nut wrench, comprising a rack member provided with teeth, a loose fulcrum member having teeth oppositely arranged to and engaging with the teeth of the rack member, the upper faces of the teeth being set at obtuse angles to said member with their points and interdental recesses less than right angles, a casing having segmental slots, trunnions on the sides of said fulcrum member taking into said slots, and a spring bearing against the back of the rack member.

4. A pipe and nut wrench comprising a toothed rack member, a casing member having semi-circular slots, a loose, tooth-faced fulcrum member provided with semi-circular trunnions taking into said slots formed in the casing member and formed with a curved face, the upper end of the casing being provided with a detachable toothed gripping piece having a curved inner face bearing against the curved face of the fulcrum.

In testimony whereof I have hereunto set my hand in presence of two subscribing witnesses.

RICHARD MICHAEL CARROLL.

Copies of this patent may be obtained for five cents each, by addressing the "Commissioner of Patents, Washington, D. C."